US006795836B2

(12) United States Patent
Arnold et al.

(10) Patent No.: US 6,795,836 B2
(45) Date of Patent: Sep. 21, 2004

(54) ACCURATELY DETERMINING AN OBJECT'S LIFETIME

(75) Inventors: Jeremy Alan Arnold, Rochester, MN (US); Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 09/751,071

(22) Filed: Dec. 29, 2000

(65) Prior Publication Data

US 2002/0107879 A1 Aug. 8, 2002

(51) Int. Cl.[7] .......................... G06F 17/30; G06F 12/00
(52) U.S. Cl. .................. 707/206; 707/102; 707/103 R; 707/201; 709/224; 709/300; 717/127; 717/128
(58) Field of Search ............................ 707/102, 103 R, 707/206, 203, 201; 709/300, 224; 717/127, 128; 711/165, 170

(56) References Cited

U.S. PATENT DOCUMENTS

| | | | | |
|---|---|---|---|---|
| 4,598,364 A | * | 7/1986 | Gum et al. ................. 364/300 |
| 4,814,971 A | * | 3/1989 | Thatte ......................... 714/15 |
| 4,853,842 A | * | 8/1989 | Thatte et al. ............... 707/206 |
| 5,241,673 A | * | 8/1993 | Schelvis ..................... 395/600 |
| 5,896,536 A | * | 4/1999 | Lindsey ...................... 395/704 |
| 6,047,295 A | * | 4/2000 | Endicott et al. ............ 707/206 |
| 6,083,281 A | * | 7/2000 | Diec et al. ..................... 717/4 |
| 6,139,198 A | * | 10/2000 | Danforth et al. ............ 395/704 |
| 6,148,310 A | * | 11/2000 | Azagury et al. ............... 707/6 |
| 6,286,016 B1 | * | 9/2001 | Heller et al. ................ 707/206 |
| 6,289,360 B1 | * | 9/2001 | Kolodner et al. ........... 707/206 |
| 6,353,860 B1 | * | 3/2002 | Hare et al. .................. 709/316 |
| 6,457,019 B1 | * | 9/2002 | Sexton et al. ........... 707/103 R |
| 6,505,344 B1 | * | 1/2003 | Blais et al. ................. 717/151 |

OTHER PUBLICATIONS

H. Lieberman et al.: A real–time garbage collector based on the lifetimes of objects, 1993, ACM, 26(6). pp 419–429.*
Henry Lieberman et al.: A Real–time Garbage Collector Based on the Lifetime of Objects, June 1983, ACM, Vol.26, pp. 419–429.*

* cited by examiner

Primary Examiner—Charles Rones
Assistant Examiner—Jacques Veillard
(74) Attorney, Agent, or Firm—Wood, Herron & Evans, LLP

(57) ABSTRACT

A method, computer system and program product operable to calculate a life span of an object by determining when an object is created and becomes collectable. A garbage collection trace algorithm conducted on a method boundary reveals when the object becomes unreachable. Trace data pertaining to the collection status of the object is stored and displayed within a record file. Other data stored by the invention relates to object creation, as well as to method entry and exit.

45 Claims, 3 Drawing Sheets

| EVENT # | THREAD I.D. | TIME STAMP | EVENT TYPE | ADDRESS | INFORMATION |
|---|---|---|---|---|---|
| 1 | A | 00:00:02 | METHOD ENTRY | 0001 | FILE_SAL |
| 2 | A | 00:00:04 | OBJECT CREATE | 0010 | INS_DAT |
| 3 | A | 00:00:07 | OBJECT CREATE | 0011 | EMP_REC |
| 4 | A | 00:00:09 | OBJECT CREATE | 0100 | STRING |
| 5 | A | 00:00:33 | METHOD ENTRY | 0101 | ZIP_START |
| 6 | A | 00:00:39 | METHOD ENTRY | 0110 | GET_SSN |
| ... | ... | ... | ... | ... | ... |
| 13 | A | 00:01:03 | OBJECT COLLECTION | 0111 | EMP_REC |
| 6 | A | 00:01:07 | METHOD EXIT | 1000 | GET_SSN |
| ... | ... | ... | ... | ... | ... |
| 27 | GC | 00:02:23 | METHOD ENTRY | 0110 | INS_DAT |
| 28 | GC | 00:02:50 | OBJ. COLLECTION | 1010 | STRING |

FIG. 6

ACCURATELY DETERMINING AN OBJECT'S LIFETIME

FIELD OF THE INVENTION

The invention is generally relates to computers and computer software. More specifically, the invention relates to the management of data structures and functions in an object oriented programming system.

BACKGROUND OF THE INVENTION

Managing available memory is critically important to the performance and reliability of a computer system. Such systems must store vast quantities of data within limited memory address space. Such data is commonly stored in the form of "objects." Memory space allocated for an object is known as an object heap. Typically each computer program has its own object heap.

Objects comprise both data structures and operations, known collectively as methods. Methods access and manipulate data structures. Objects having identical data structures and common behavior can be grouped together into classes. Each object inherits the data structure and methods of the particular class from which it was instantiated. Further, a hierarchical inheritance relationship exists between multiple classes. For example, one class may be considered a parent of another, child class. The child class is said to be derived from the parent class and thus, inherits all of the attributes and methods of the parent class.

Object structure includes data and pointer fields. Pointers contain the addresses of other memory locations; data fields embody information or other objects. The object 10 of FIG. 1 has an identifier field 12, data field 14 and pointers 16, 18. The identifier field 12 contains processing instructions used only when the object 10 is compiled, so it is not necessarily stored with the object 10. A dashes distinguish the identifier field 12 from information stored at run time.

In the figure, pointers 16 are represented as arrows pointing to other objects 20. A nil value of pointer 18 is represented by an "X" within the corresponding pointer field. Items 14 are contained by the object and are referred to as internal objects, while objects 20 referenced by the object's 10 pointers are known as external objects.

The exemplary object 10 also has names 22 associated with it. Each name is a labeled pointer to the object. Since names are only used by the compiler at compile time, they do not require any storage at run time. This fact is represented by the use of dashed boxes to enclose the name pointers. Note that external objects can also contain pointers to other objects recursively, creating an object with arbitrary "depth."

The depth of an object is determined by counting the number of pointers that must be followed to reach it, starting from a name. Thus in the figure, names 22 are at depth 0, the object 10 is at depth 1, and the external objects 20 are at depth 2. For consistency, the depth attributed to the manipulation of a pointer corresponds to the depth at which the pointer is stored. Thus, manipulations of pointers 16 as shown in FIG. 1 are considered to be at depth 1.

Whenever a program creates a new object, available memory is reserved using a process known as memory allocation. The Java programming environment developed by Sun Microsystems is one example of a programming framework that utilizes memory allocation. Given the limited amount of memory available in such an environment, it is important to deallocate memory reserved for data no longer in use. Otherwise, system performance will suffer as available memory is consumed.

A computer program known as a garbage collector empties unused memory that has been allocated by other programs. Generally, a garbage collection algorithm carries out storage management by automatically reclaiming storage. Garbage collectors are typically activated when an object heap becomes full. A key functionality of a garbage collection algorithm involves determining if an object is no longer reachable by an executing program. A properly collectable object must be unreachable either directly or through a chain of pointers.

Thus, the garbage collector must identify pointers directly accessible to the executing program. Further, the collector must identify references contained within that object, allowing the garbage collector to transitively trace chains of pointers. When the data structure of an object is deemed unreachable, the garbage collector reclaims memory. The memory is deallocated even if it has not been explicitly designated by the program.

Specific methods for memory reclamation include reference counting, mark-scan and the copying garbage collection. In reference counting collection, as diagramed in FIG. 2, each external object 20 is associated with a count 24 reflecting the number of objects that point to it. Every time a new pointer implicates an external object 20, the count 24 is incremented. Conversely, the count 24 is decremented every time an existing reference is destroyed. When the count 24 goes to zero, the object 20 and its associated count 24 are deallocated.

A variation of the reference counting scheme known as weighted reference counting removes the requirement of referencing shared memory, but some bookkeeping is still required at run time. Another variation known as lazy reference counting reduces the run-time CPU requirements by deferring deallocation operations and then combining them with allocations, but does not eliminate them entirely.

An alternative method, called mark-scan garbage collection, never explicitly deallocates external objects. Periodically, the garbage collection process marks all data blocks that can be accessed by any object. Unreachable memory is reclaimed by scanning the entire memory and deallocating unmarked elements.

Each cycle of the mark-scan algorithm sequentially operates in mark and sweep stages. In the mark stage, the collector scans through an object heap beginning at its roots, and attempts to mark objects that are still reachable from a root. An object is deemed reachable if it is referenced directly by a root or by a chain of objects reachable from a root. In the sweep stage, the collector scans through the objects and deallocates any memory reserved for objects that are unmarked as of completion of the mark stage. Some variations of mark-scan require that active program threads be halted during collection, while others operate concurrently.

Copying garbage collectors are similar to those of the mark-scan variety. However, instead of marking those items that can be reached by reference, all reachable data structures are periodically copied from one memory space into another. The first memory space can then be reclaimed in its entirety. A specific implementation of a copying garbage collector is a generational garbage collector, which partitions an object heap into new and old partitions. A generational garbage collector relies on a tendency for newer objects to cease to be used more frequently than older objects. Put another way, as an object is used over time, it becomes less and less likely that the object will cease being used.

A generational garbage collector manages an object heap by scanning through newer objects in a new partition of the heap. The collector deallocates memory for objects that are no longer in use, and move objects that live beyond a predetermined period into an old partition. Given that older objects tend to be more stable, typically no scanning of the old partition of the object heap is required.

Despite the progresses afforded by the above garbage collection techniques, obstacles to memory management remain. One particular area of concern relates to "short lived" objects. Although such objects may be used only briefly, they tend to linger and take up space in the object heap between garbage collection cycles. Further, the overhead associated with allocating and deallocating short lived objects is disproportionally high relative to "longer lived" objects.

Deallocating processes require the computer to perform certain operations that are outside of normal productive operations. These additional processes burden the overall operation of the computer. Therefore, for both performance and storage concerns, it is desirable to minimize the occurrence of short lived objects. For instance, a programmer conducting a debugging operation could consolidate the functionality of a located short lived object into a long lived one. However, this task is complicated by the absence of an accurate method of calculating the life span of an object. Currently, a programmer is relegated to estimating life spans as a function of the time that the object is collected. Since the initiation of a garbage collection cycle does not necessarily coincide with when an object becomes unreachable, conventional life span measurements include periods where the object is actually defunct. Therefore a significant need exists for a manner of accurately calculating the lifetime of an object.

SUMMARY OF THE INVENTION

The present invention involves a method, computer system and program product operable to calculate a life span of an object. The invention determines when an object is created and when it becomes collectable. A processor conducts a garbage collection trace algorithm on a method boundary to determine when the object becomes unreachable. In one embodiment, the frequency with which the trace algorithm is performed is modified via a user interface. In another application consistent with the invention, the processor conducts the trace algorithm at every method exit.

Trace data pertaining to the algorithm is stored along with other data relating to method entry and exit, as well as to object creation. A visualizer program displays the trace data to the user. In one embodiment, the user locates an object within an object oriented programing environment based on the life span of the object. Another embodiment allows the user to determine what method was running at the time that the object became collectable.

The above and other objects and advantages of the present invention shall be made apparent from the accompanying drawings and the description thereof.

BRIEF DESCRIPTION OF THE DRAWINGS

FIG. 6 is a table populated with exemplary trace data generated in accordance with the principles of the present invention.

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Hardware Environment

Figure 3:
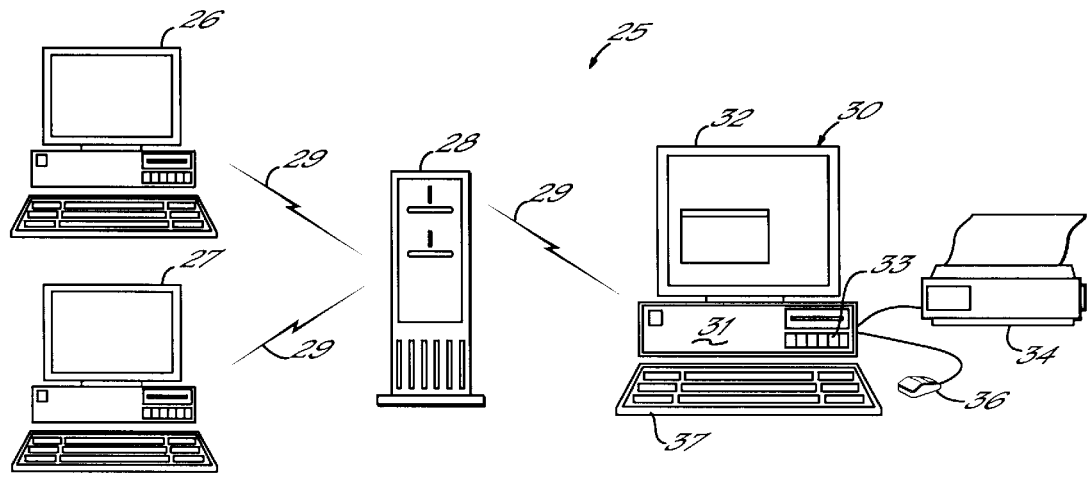
FIG. 3 is a block diagram of a networked computer system consistent with the present invention.

Turning to the drawings, wherein like numbers denote like parts throughout the several views, FIG. 3 illustrates a computer system 25 consistent with the invention. Computer system 25 is illustrated as a networked computer system including one or more client computer systems 26, 27 and 30 (e.g., desktop or personal computers, workstations, etc.) coupled to server system 28 through a network 29.

Network 29 may represent practically any type of networked interconnection, including but not limited to local-area, wide-area, wireless, and public networks (e.g., the Internet). Moreover, any number of computers and other devices may be networked through network 29, e.g., multiple servers. Furthermore, it should be appreciated that the principles of the invention may be utilized as well by stand-alone computers and associated devices consistent with the invention.

Computer system 30, which may be similar to computer systems 26, 27, may include one or more processors such as a microprocessor 31; a number of peripheral components such as a computer display 32 (e.g., a CRT, an LCD display or other display device); storage devices 33 such as hard, floppy, and/or CD-ROM disk drives; a printer 34; and various input devices (e.g., a mouse 36 and keyboard 37), among others. Computer system 30 operates under the control of an operating system, and executes various computer software applications, programs, objects, modules, etc. Moreover, various applications, programs, objects, modules, etc. may also execute on one or more processors in sever 28 or other computer systems 26, 27, e.g., in a distributed computing environment.

In general, the routines executed to implement the illustrated embodiments of the invention, whether implemented as part of an operating system or a specific application, program, object, module or sequence of instructions will be referred to herein as computer programs. The computer programs typically comprise instructions that, when read and executed by one or more processors in the devices or systems in computer system 30, cause those devices or systems to perform the steps necessary to execute steps or elements embodying the various aspects of the invention.

Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others and transmission type media such as digital and analog communications links.

Those skilled in the art will recognize that the exemplary environment illustrated in FIG. 3 is not intended to limit the present invention. Indeed, those skilled in the art will recognize that other alternative hardware environments may be used without departing from the scope of the invention.

Software Environment

Figure 4:
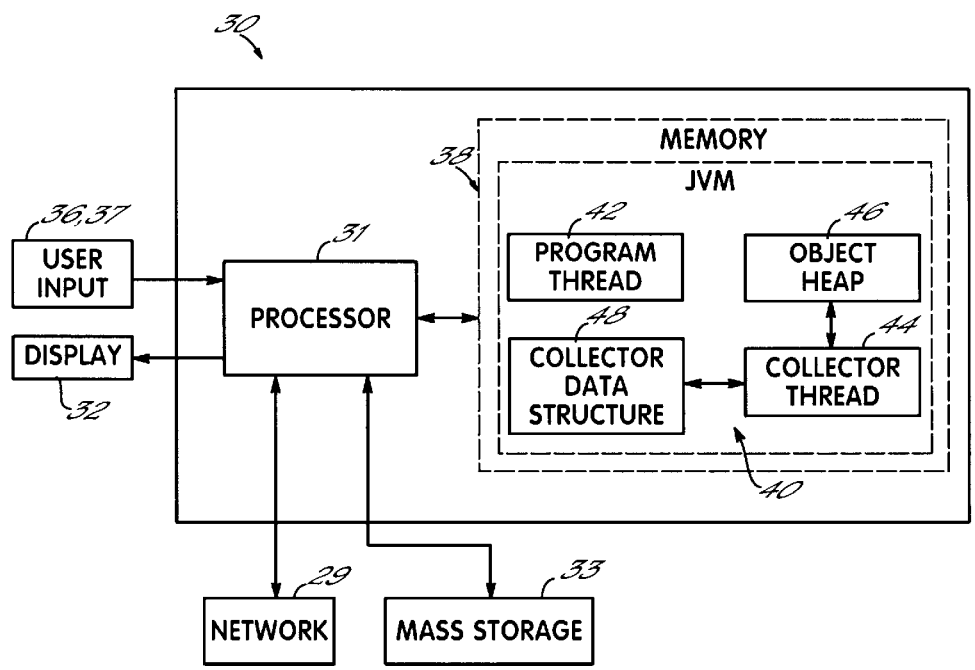
FIG. 4 is a block diagram of an exemplary hardware and software environment for a computer from the networked computer system of FIG. 3.

FIG. 4 illustrates one suitable software environment for computer system 30 consistent with the invention. A processor 31 is illustrated as coupled to a memory 38 as well as to several inputs and outputs. For example, user input is received by processor 31, e.g., by mouse 36 and keyboard 37, among others. Additional information may be passed between computer system 30 and other computer systems in networked computer system 25 via network 29. Additional information may be stored to and/or received from mass storage 33. Processor 31 also outputs display data to display 32. It should be appreciated that computer system 30 includes suitable interfaces between processor 31 and each of components 29, 32, 33, 36, 37 and 38 as is well known in the art.

A Java Virtual Machine (JVM) execution module 40 is illustrated as resident in memory 38, and is configured to execute program code on processor 31, e.g., one or more program threads 42, as well as a collector thread 44 that is used to deallocate unused data stored in an object heap 46. Collector thread 44, which is described in greater detail below, also utilizes a plurality of data structures 48 during its operation.

Execution module 40 may be resident as a component of the operating system of computer system 30, or in the alternative, may be implemented as a separate application that executes on top of an operating system. Furthermore, any of execution module 40, program thread 42, collector thread 44, object heap 46 and collector data structures 48 may, at different times, be resident in whole or in part in any of memory 38, mass storage 33, network 29, or within registers and/or caches in processor 31.

In one embodiment of the invention, JVM 40 is specially configured to operate in a developmental environment. Since such environments are geared towards debugging, as opposed to performance, JVM 40 may be configured for flexibility and optimized code correction. More specifically, the developmental emphasis means that processing delays associated with memory management techniques are better tolerated than with conventional machines.

It should be appreciated that the various software components may also be resident on, and may execute on, other computers coupled to computer system 25. Specifically, one particularly useful implementation of an execution module consistent with the invention is executed in a server such as an AS/400 midrange computer system from International Business Machines Corporation. It should be appreciated that other software environments may be utilized in the alternative.

Life Span Determination

Figure 1:
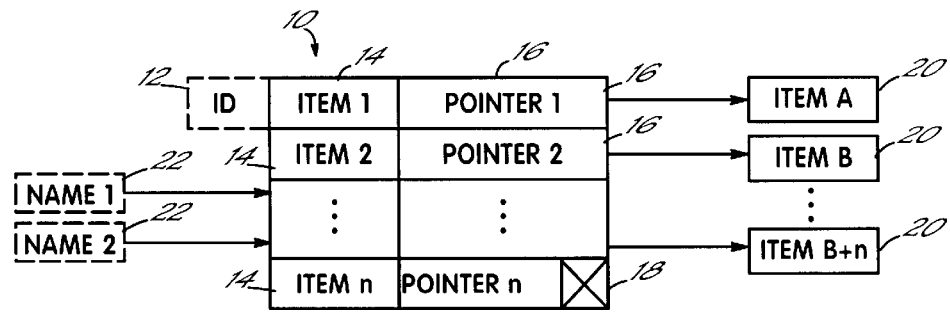
FIG. 1 represents an object in accordance with the principles of the present invention.
Figure 2:
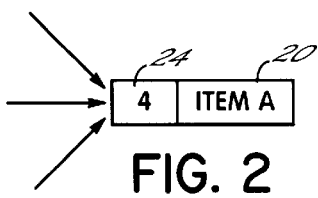
FIG. 2 represents a reference count attached to an external object in a manner consistent with the prior art.
Figure 5:
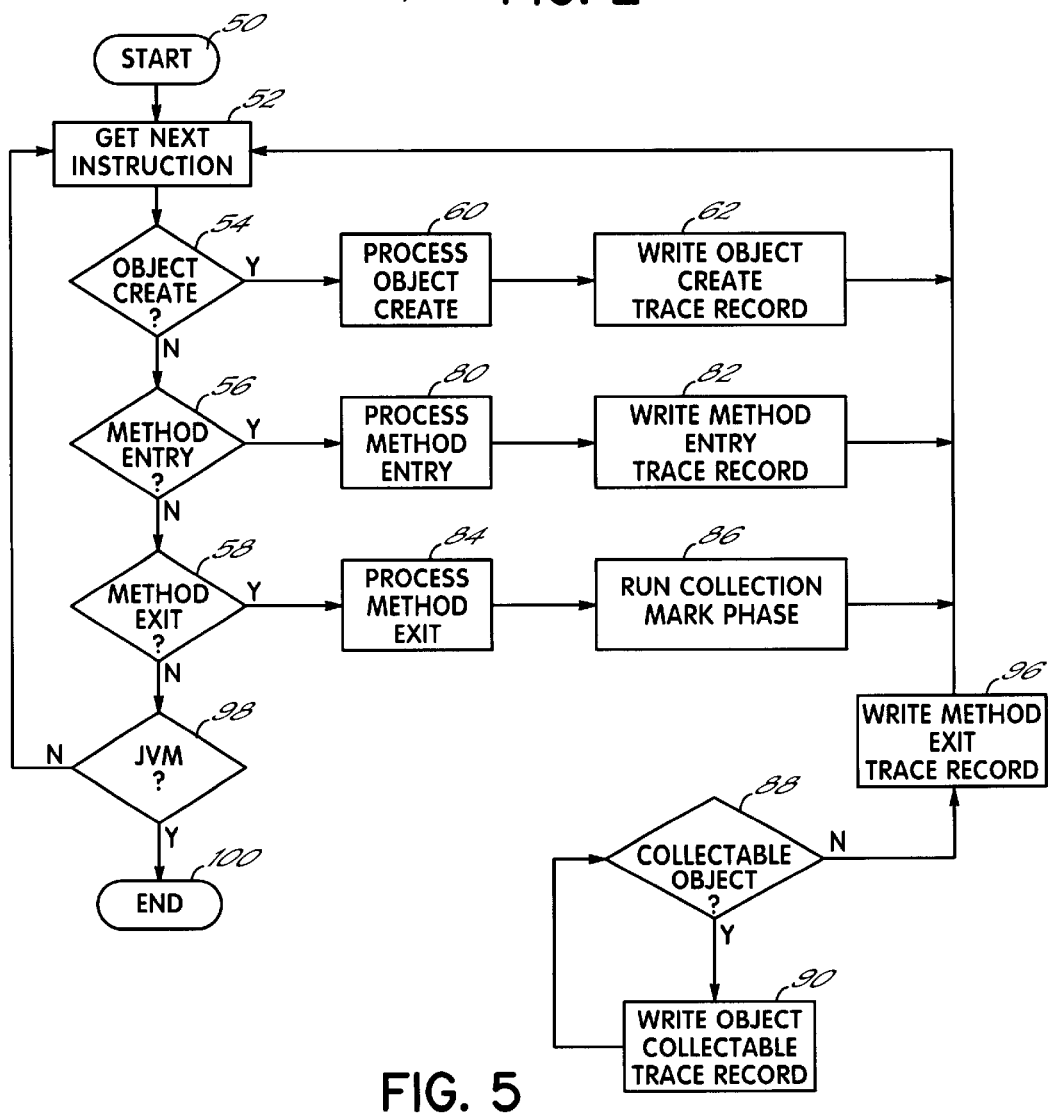
FIG. 5 is a flow chart illustrating computer processing steps that are in accordance with the principles of the present invention.

The invention calls for the JVM 40 of FIG. 4 to cycle through an instruction sequence represented by the flowchart of FIG. 5. The sequence determines the life span of an object by executing a trace collection algorithm on a method boundary. Other data gleaned from the invention relates to object creation, as well as to method entries and exits. A program of the exemplary embodiment additionally stores and initiates the display of trace data relating to each instruction.

Turning to the figure, the JVM begins the program cycle at block 50. While the invention can operate concurrently with other programs, the instruction sequence is preferably conducted while other programs are halted. This precaution ensures that concurrent processes do not affect objects while they are under evaluation. At block 52, the JVM retrieves the first instruction. Of note, the sequence of the exemplary instructions 54, 56, 58 may be altered or augmented with other processes without straying from the principles of the invention.

Instructions in a Java environment include byte codes, or functions, that are each operable to perform a simple processing operation. Examples of such operations include loading a value from out of a particular location or calling a subroutine. The exemplary instructions of FIG. 5 may each invoke multiple methods to achieve their purpose. In the flowchart, the first occurring instruction option relates to object creation. Assuming that an object creation requirement is indicated at block 54, the JVM executes code operable to create an object. For instance, the program could create an object configured to maintain employee records at block 60. Trace data that relates to the creation instruction is written to a trace record at block 62.

A trace record that is consistent with the principles of the present invention is shown in FIG. 6. Diagnostic and other statistical data relevant to the creation instruction include event and thread identification numbers 64, 66, as shown in row 68. A time stamp value 70 is also recorded. Other relevant data includes an event type 72, or method description, as well as an information column 74, which designates the name of the object manipulated by the method. While the enumerated record categories are shown in FIG. 6, a record table consistent with the invention is not limited to these data points.

Furthermore, a post-processor may be used to visualize the trace data for the programmer, allowing for a more focused and tailored display. For instance, a graphical interface summarizes information of particular interest to the programmer. For example, a display could list the life span of a select object by calculating the difference between associated creation and collection time stamps. Another list could reveal the final method that manipulated the object. A variation of such a list can signal the unanticipated persistence of an object meant to be collected by a programmer's method, a scenario known as object leakage. Still another display lists all objects having a life span within a particular range. Such a display would assist a debugger in locating short lived objects.

Returning to the flowchart of FIG. 5, the program searches for a next occurring instruction 52 after writing to the trace record 62. If the next instruction calls for a method entry, as opposed to a second object creation instruction, then processing required to initiate a method is conducted at block 56. For instance, the program of FIG. 5 requires a particular subroutine to sort through employee zip codes. At block 80, a method, zip_start, operable to initiate the subroutine is executed. Trace data relating to the entry of start zip is written to the trace record 82, and the program sequence is begun again at block 52.

Assuming the next instruction at block 58 is a method exit, then the objects required to end the function are conjured and executed by the JVM. For instance, get_ssn is a method that retrieves and loads a social security value from a database into an employee benefits field. The application of get_ssn ends at time stamp 00:01:07. Accordingly, processing required to end get_ssn is accomplished at block 84. As with the above instructions, the program relates trace data relevant to the exit of method get_ssn to the record of FIG. 6.

Prior to repeating the writing the method exit to the trace record 96, a garbage collector algorithm is invoked at block 86. Any of the deallocation methods discussed herein are compatible with the present invention, including copying, mark-scan and reference counting collectors. Further, such algorithms may be optimized for the instrumented JVM environment. For example, a generational-type collector can be modified to only track and mark changed objects, obviating the need to evaluate all objects. Similarly, an object heap can be apportioned to selectively optimize a collector's evaluation. A mark-scan collector can be configured so that it merely locates unreachable objects without actually sweeping them.

The process of FIG. 5 call for such a modified mark-scan collector at block 86. By way of review, a mark-scan collector cycles through multiple collection stages to reclaim unused data in an object heap. A first stage initiates the collection cycle. Next, a mark stage is executed that marks any used, or reachable, objects.

Typically, the mark stage is divided into several distinct stages, e.g., a "mark roots" stage and a "trace" stage. The mark roots stage marks the global and local roots in the object heap—that is, any variables that are defined as global or static or that are stored in various stacks and registers within the computer system. The trace stage then marks the objects reachable from other marked objects. The trace stage is complete when all objects that reference marked objects are also marked.

When marking objects in a concurrent collection cycle, a four-color marking scheme is typically utilized. A white color indicates that an object is unmarked. A gray color indicates that an object is marked, but that its direct descendants may not yet be marked (i.e., some may be white). A black color indicates that an object is marked and all of its direct descendants are marked (either gray or black). Finally, a blue color indicates that the object is on the free list. With this scheme, gray or black objects are also referred to as "shaded" objects.

Depending upon the language being supported, additional stages may be present in a collector thread. For example, Java may require a "finalize trace" stage between the mark and sweep stages to identify and trace objects ready for finalization. A finalizer ensures that all files and resources used by object are closed prior to deallocation. The present invention can account for finalization by writing traces to a separate record, or even by using a separate deallocation algorithm to monitor the finalizer.

Once the collector locates an unreachable object at block 88, the object is identified and trace record data relating to the unreachable object is stored a block 90. For example, the invention determines that all pointers cease to reference object ins_dat at time stamp 00:02:23. The name 92 of the object is reflected in the trace record of FIG. 6, along with the collection event 94 precipitating its identification.

The JVM determines the method that was running at the time the object became collectable by associating creation and exit time stamps for respective objects and methods. The mark-scan collector continues to locate collectable objects at block 88 until all are recorded in the trace record. Then at block 96, the trace data relating to the method's exit are related to the record of FIG. 6.

The sequence begins again at block 52, and the JVM searches for instructions to create an object 54 or method entry 56/exit 58. If an instruction for exiting the JVM is encountered at block 98, then the program is ended at block 100. Otherwise, the program sequence repeats at block 52. Of note, while the illustrated embodiment is configured to run a deallocation program after every method exit, another embodiment incorporates a user interface that allows a programmer to interactively select the collection frequency.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A computer program product comprising:
   a program configured to perform a method of calculating a life span of an object by conducting a garbage collection trace algorithm on every method exit, the method comprising determining the life span based on when an object is created and when it is collectable, and
   a signal bearing media bearing the program.

2. The program product of claim 1, wherein the signal bearing media is transmission type media.

3. The program product of claim 1, wherein the signal bearing media is recordable media.

4. A process of calculating a life span of an object, wherein the object is a data structure and a set of computer operations operable to access the data structure, comprising:
   determining when the object is created;
   determining when the object becomes collectable, wherein the object is
   collectable when it becomes unreachable by an executing program; and
   calculating the life span of the object based upon when the object was created and when the object becomes collectable; and
   performing a garbage collector trace algorithm on every method exit.

5. The process of claim 4, wherein the method is a computer function configured to access the object.

6. The process of claim 4, further comprising modifying the occurrence of the garbage collector trace algorithm via a user interface.

7. The process of claim 4, further comprising storing collector trace data associated with the garbage collector trace algorithm.

8. The process of claim 4, further comprising storing collector trace data pertaining to the garbage collector trace algorithm and selected from among the group of: a time stamp, event number, event type, address, thread identification and information field.

9. The process of claim 4, further comprising storing creation trace data associated with creating the object.

10. The process of claim 4, further comprising storing creation trace data pertaining to creating the object and selected from the group of: a time stamp, event number, event type, address, thread identification and information field.

11. The process of claim 4, further comprising storing entry trace data associated with executing a method.

12. The process of claim 11 further comprising storing entry trace data pertaining to entering the method selected from among the group of: a time stamp, event number, event type, address, thread identification and information field.

13. The process of claim 4, further comprising storing exit trace data associated with exiting a method.

14. The process of claim 13, further comprising storing exit trace data pertaining to exiting the method selected from among the group of: a time stamp, event number, event type, address, thread identification and information field.

15. The process of claim 4, further comprising initiating a visualizer program configured to display information to a user.

16. The process of claim 4, further comprising locating the object based on the life span.

17. The process of claim 4, further comprising determining the method running at the time the object becomes collectable, wherein data pertaining to the method is associated with a first time stamp and stored, and the first time stamp is correlated to a second time stamp, wherein the second time stamp corresponds to when the object becomes collectable.

18. A process of determining when an object is collectable, wherein an object is a data structure and a set of computer operations operable to access the data structure, wherein the object is collectable when it becomes unreachable by an executing program, the process comprising performing a garbage collector trace algorithm on a method boundary, wherein the method is a computer function configured to access the object, and determining the life span of the object based upon when the object is created and when the object becomes collectable, and the process further comprising storng trace data pertaining to at least one of the garbage collector and creating the object, wherein the trace data is selected from among the group of: a time stamp, event number, event type, address, thread identification and information field.

19. The process of claim 18, wherein calculating the life span of the object further comprises determining when the object is created and when the object is collectable.

20. The process of claim 18, further comprising performing the garbage collector trace algorithm on every method exit.

21. The process of claim 18, further comprising modifying the frequency with which the garbage collector trace algorithm is conducted via a user interface.

22. The process of claim 18, further comprising storing collector trace data associated with the garbage collector algorithm.

23. The process of claim 18, wherein storing the trace data further comprises storing collector trace data pertaining to the garbage collector.

24. The process of claim 18, further comprising storing creation trace data associated with creating the object.

25. The process of claim 18, wherein storing the trace data further comprises storing creation trace data pertaining to creating the object.

26. The process of claim 18, further comprising storing entry trace data associated with executing a method.

27. The process of claim 18, further comprising storing exit trace data pertaining to exiting the method selected from among the group of: a time stamp, event number, event type, address, thread identification and information field.

28. The process of claim 18, further comprising initiating a visualizer program configured to display information to a user.

29. The process of claim 18, further comprising locating the object based on the life span.

30. The process of claim 18, further comprising determining the method running at the time the object becomes collectable, wherein data pertaining to the method has is associated with a first time stamp and stored, and the first time stamp is correlated to a second time stamp, wherein the second time stamp corresponds to when the object became collectable.

31. A process of determining when an object is collectable, wherein an object is a data structure and a set of computer operations operable to access the data structure, wherein the object is collectable when it becomes unreachable by an executing program, the process comprising performing a garbage collector trace algorithm on a method boundary, wherein the method is a computer function configured to access the object, and determining the life span of the object based upon when the object is created and when the object becomes collectable, and the process further comprising storing at least one of entry trace data pertaining to entering the method and exit trace data pertaining to exiting the method.

32. The process of claim 31, wherein storing the at least one of the entry trace data pertaining to entering the method and exit trace data pertaining to exiting a method further comprises storing trace data selected from among the group of: a time stamp, event number, event type, address, thread identification and information field.

33. A computer system comprising a processor operable to determine a life span of an object by conducting a garbage collection trace algorithm on every method exit, wherein an object is a data structure and a method, wherein the method is a set of computer operations operable to access the data structure, wherein the processor calculates the life span by determining when the object is created and when the object is collectable, wherein the object is collectable when it becomes unreachable by an executing program.

34. The computer system of claim 33, wherein the processor adjusts the occurrence of the garbage collector according to input from a user interface.

35. The computer system of claim 33, wherein the processor stores collector trace data associated with the garbage collector.

36. The computer system of claim 33, wherein the processor stores collector trace data pertaining to the garbage collector and selected from among the group of: a time stamp, event number, event type, address, thread identification and information field.

37. The computer system of claim 33, wherein the processor stores creation trace data associated with creating the object.

38. The computer system of claim 33, wherein the processor stores creation trace data pertaining to creating the object and selected from the group of: a time stamp, event number, event type, address, thread identification and information field.

39. The computer system of claim 33, wherein the processor stores entry trace data associated with executing a method.

40. The computer system of claim 33, wherein the processor stores entry trace data pertaining to entering the method selected from among the group of: a time stamp, event number, event type, address, thread identification and information field.

41. The computer system of claim 33, wherein the processor stores exit trace data associated with exiting a method.

42. The computer system of claim 33, wherein the processor stores exit trace data pertaining to exiting the method selected from among the group of: a time stamp, event number, event type, address, thread identification and information field.

43. The computer system of claim 33, wherein the processor initiates a visualizer program configured to display information to a user.

44. The computer system of claim 33, wherein the processor locates the object based on the life span of the object.

45. The computer system of claim 33, wherein the processor determines the method that running at the time the object becomes collectable, wherein data pertaining to the method is associated with a first time stamp and stored, and the first time stamp is correlated to a second time stamp, wherein the second time stamp corresponds to when the object became collectable.

* * * * *